May 27, 1930.  J. L. ESTORGE  1,760,194
METER PROTECTOR
Filed April 27, 1926

Inventor
J. L. Estorge
By Philip A. H. Sewell
Attorney

Patented May 27, 1930

1,760,194

UNITED STATES PATENT OFFICE

JULIAN L. ESTORGE, OF NEW ORLEANS, LOUISIANA

METER PROTECTOR

Application filed April 27, 1926. Serial No. 104,947.

The invention relates to meter protectors and has for its object to provide a meter protector preferably formed from transparent material and which protector comprises a casing entirely housing the meter and through which casing the meter can be easily observed, but at the same time protects an unauthorized person from tampering with the meter.

A further object is to provide a meter protector comprising a base plate to which a meter is attached, the upper end of which plate is provided with an L-shaped flange which overlies a flange carried by the upper end of the meter cover and the opposite sides of the base plate with marginal flanges which engage the outer sides of the cover and prevent lateral movement of the cover. The lower end of the base plate is provided with an extension having flanges at its opposite sides, and between which flanges an integral hollow extension of the cover is received, and which extension extends into an opening in the upper side of the switch box and provided with a transversely disposed groove which receives the edge of the upper wall of the switch box, and through which extension the meter wires extend, and the extension prevents tampering with the meter wire.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
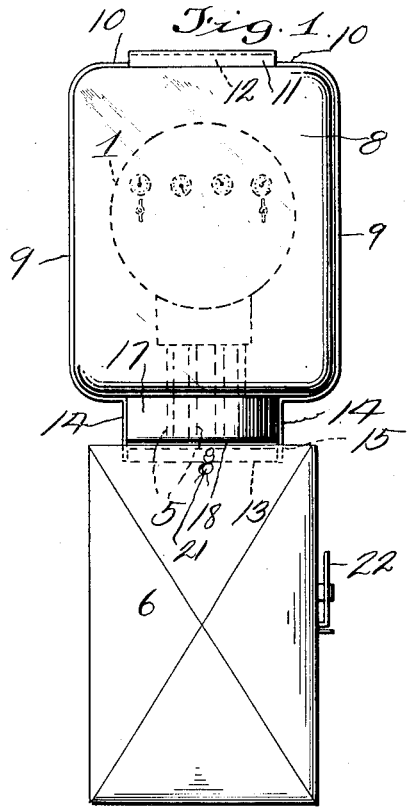
Figure 1 is a view in elevation of the meter cover and switch box showing the same applied to a conventional form of meter.
Figure 2:
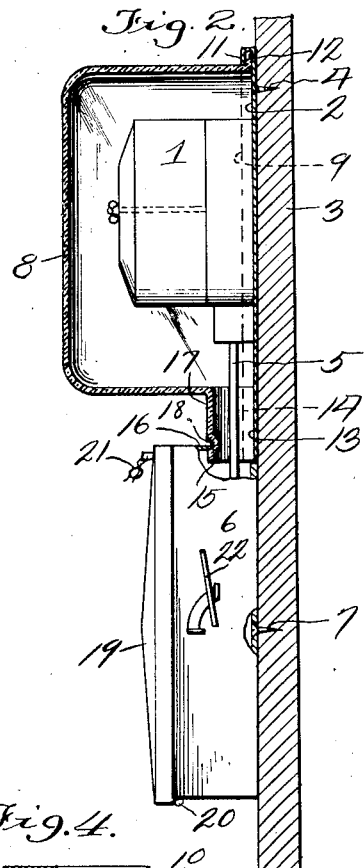
Figure 2 is a vertical longitudinal sectional view through the meter cover and a portion of the switch box.
Figure 3:
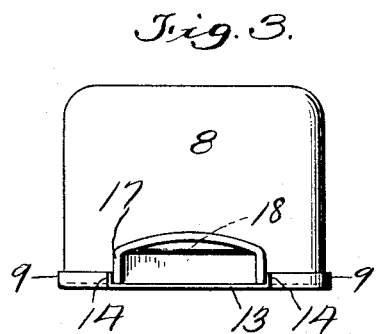
Figure 3 is a bottom plan view of the meter cover and meter cover plate.
Figure 4:
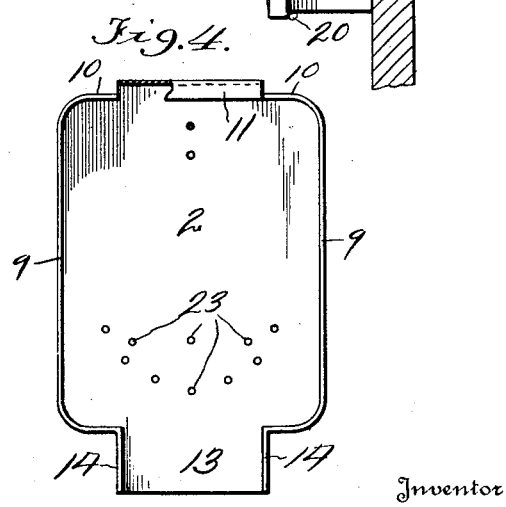
Figure 4 is a view in elevation of the meter plate.

Referring to the drawing, the numeral 1 designates a conventional form of electric meter, which meter is secured to a base plate 2 in any suitable manner. Base plate 2 is secured to a panel 3 by means of screws 4, which however are shown only for purposes of illustration as the plate can be secured to the panel in any suitable manner. Meter 1 is provided with a plurality of wires 5 which lead downwardly into the switch box 6 in the usual manner, and which switch box is secured to the panel 3 by means of screws 7. It has been found that unauthorized persons tamper with the meters 1 and the wires 5 in various ways to prevent the same from properly registering or registering at all and to obviate this difficulty a housing 8 is provided for the meter 1, which housing is preferably formed from transparent material so that the meter can be easily read by an inspector or other person, but at the same time access to the meter is prevented. Housing 8 is relatively large in relation to the meter 1, thereby forming a relatively large chamber around the meter and spacing the same from the housing walls 8. The opposite sides of the plate 2 are provided with outwardly extending flanges 9, which flanges engage opposite sides of the housing 8 and prevent lateral movement of the housing. Flanges 9 extend over the opposite upper sides of the plate 2 as shown at 10 and terminate adjacent the ends of the downwardly extending L-shaped flange 11, which flange engages over the integral upwardly extending flange 12 of the housing 8 and prevents outward movement of the upper end of the housing. The lower end of the plate 2 is provided with an extension 13 having its opposite sides provided with flanges 14 and the extension 13 and flanges 14 extend through the opening 15 in the upper wall 16 of the switch box 6. The lower side of the housing 8 is provided with a hollow reduced integral extension 17 which is disposed between the flanges 14 and extends through the switch box opening 15, and is provided with a transversely disposed groove 18, in which the edge of the wall 16 is disposed, therefore it will be seen that the wall 16 will prevent outward movement of the housing 8 at its lower end, and in combination with the L-shaped member 11 and the flanges 9 and 10 will positively hold the housing 8 against movement in any direction.

The switch box 6 may be of any construction however it is preferably provided with a cover 19 which is hingedly connected at 20 to the box and a single seal 21 is used for sealing the cover 19 closed, and the switch may be controlled by an outside lever 22, therefore it will be seen a single sealing means may be used. It will also be seen when the device is assembled the only way the cover 8 can be removed is by removing the box 6 from its position.

From the above it will be seen a meter protector housing is provided which is simple in construction, may be easily and quickly applied to a conventional form of meter and the same can be cheaply manufactured and sold. Plate 2 is preferably provided with a plurality of apertures 23 whereby various types of meters may be attached thereto.

The invention having been set forth what is claimed as new and useful is:—

1. A switch box and meter housing comprising a plate on which said meter is mounted, a housing for said meter disposed on the plate, the upper end of said housing being provided with a flange, a flange carried by the upper end of the plate and overlying the housing flange, flanges carried by opposite sides of the plate and engaging opposite sides of the housing, an extension member carried by the plate and extending through the opening in the switch box, flanges carried by opposite sides of the extension plate, a hollow extension carried by the housing and disposed between the flanges of the extension plate and extending into the switch box through an opening therein, an edge of said opening being disposed in a groove of the housing extension.

2. A switch box and meter housing comprising a plate on which the meter is mounted, a housing carried by said plate, a hollow extension carried by said housing and extending into the switch box through an opening in one wall of the switch box, an extension plate carried by the first mentioned plate and extending through the opening in the wall of said switch box, angularly disposed flanges carried by opposite sides of the extension plate and engaging opposite sides of the housing extension, the edge of said wall being disposed in a groove transversely of the housing extension.

In testimony whereof I hereunto affix my signature.

JULIAN L. ESTORGE.